United States Patent [19]

Vesci

[11] 3,853,024
[45] Dec. 10, 1974

[54] TWO SPEED DRIVE SYSTEM FOR PRINT MECHANISM OR THE LIKE

[75] Inventor: Anthony Vesci, Endicott, N.Y.

[73] Assignee: International Business Machines Corporation, Armonk, N.Y.

[22] Filed: Oct. 29, 1973

[21] Appl. No.: 410,849

[52] U.S. Cl. .................................................. 74/812
[51] Int. Cl. ............................................. F16h 5/52
[58] Field of Search ....................................... 74/812

[56] References Cited
UNITED STATES PATENTS

| | | | |
|---|---|---|---|
| 2,687,658 | 8/1954 | Nelson et al. | 74/812 |
| 3,209,621 | 10/1965 | Laurent | 74/812 |
| 3,580,110 | 5/1971 | Brouwer et al. | 74/812 |

Primary Examiner—Leonard H. Gerin
Attorney, Agent, or Firm—John S. Gasper

[57] ABSTRACT

A two-speed unidirectional drive system has a single-speed reversible drive motor with an output shaft having a first unidirectional drive assembly mounted thereon. A second unidirectional drive assembly is mounted on a parallel idler shaft. The drive assemblies each have a drive gear and a drive pulley concentrically mounted on the respective shafts and a freewheeling clutch coupling the drive pulleys to the respective shafts. The drive gears are in driving engagement when mounted on the motor and idler drive shafts producing counter rotation thereof. The freewheeling clutches couple the drive pulleys to the drive motor and idler drive shafts to rotate the pulleys in the same direction. Drive belt means connects the drive pulleys with a driven pulley assembly on a driven shaft. Dual speed is obtained by using drive gears, drive pulleys, driven pulleys or any combination thereof with different size ratios.

6 Claims, 4 Drawing Figures

PATENTED DEC 10 1974 3,853,024

TWO SPEED DRIVE SYSTEM FOR PRINT MECHANISM OR THE LIKE

BACKGROUND OF THE INVENTION

1. Field of the Invention

This invention relates to drive mechanisms and particularly to two-speed unidirectional drive system.

2. Description of the Prior Art

Two-speed unidirectional drive systems are known in which a reversible drive motor is connected through transmission gearing means to drive an output gear at two different speeds depending on the direction of rotation. The transmission gears generally include one-way clutches designed to convert the bidirectional rotation of the drive motor to unidirectional output from the system. It is also known to use belts in combination with clutches and transmission gears when the unidirectionally driven element is relatively remote from the drive motor.

Such prior drive systems have been relatively complex and lack flexibility. Each element of the mechanism is generally unique and lacks significant commonality of parts. Repair of service of parts is done only at the expense of substantial disassembly. Conversion to different speed ratios by interchanging the existing elements cannot be readily achieved.

SUMMARY OF THE INVENTION

It is therefore a general object of this invention to provide an improved two-speed unidirectional drive system.

It is a further object to provide an improved two-speed unidirectional drive system which is relatively simple and can be readily serviced and uses a substantial number of common parts.

It is also an object to provide an improved two-speed unidirectional drive system for use in driving the type carrier of a printer apparatus.

It is a further specific object to provide an improved two-speed unidirectional drive system in which the speed ratios are readily converted by interchanging elements of the drive mechanism without rebuilding the drive mechanism.

The above, as well as other objects, are achieved in accordance with this invention by providing a pair of unidirectional drive assemblies, one of which is mounted on the output shaft of a single-speed reversible motor and the other of which is mounted on a parallel idler shaft. Each unidirectional drive assembly comprises a drive gear and a drive pulley concentrically mounted on its respective drive shaft and a free-wheeling clutch for coupling the drive pulleys respectively to the motor and idler shafts. The drive gears mounted on their corresponding drive shafts are drivingly engaged to produce opposite relative rotations of the drive shafts. The unidirectional clutches are mounted on the drive and idler shafts so that both are operative to produce clutching in the same direction of rotation. In a first embodiment, a single loop drive belt is wrapped around each drive pulley and a drive pulley attached to an output driven shaft. The drive pulleys are of different diameters and interchangeable on the drive and idler shafts. In a second embodiment, a pair of driven pulleys are mounted co-axially on the output driven shaft and an individual drive belt separately connects the drive pulleys with their corresponding driven pulleys on the driven shaft. In this second embodiment, the driven pulleys are of different diameters and are removably interchangeable on the driven shaft.

With this arrangement one clutch operates to drive while the other is slipping since the clutches will lock only on the shaft which is rotating in the drive direction. The difference in speed of the belt is determined by the difference in the size of the drive gears or by the difference in the size of the two pulleys or by a combination of both. By using pulleys and belts in this manner a less complex structure is provided for repair and disassembly. Also, with this structure, the speed ratios can be readily changed by merely changing the mounting of the pulleys and/or gears from motor drive to idler shafts. And since the gears or pulleys are interchangeable, the drive system is more economical and simple in design. The number of parts in this arrangement is greatly reduced.

The foregoing and other objects, features and advantages of the invention will be apparent from the following more particular description of preferred embodiments of the invention, as illustrated in the accompanying drawing.

DETAILED DESCRIPTION

Figure 1:
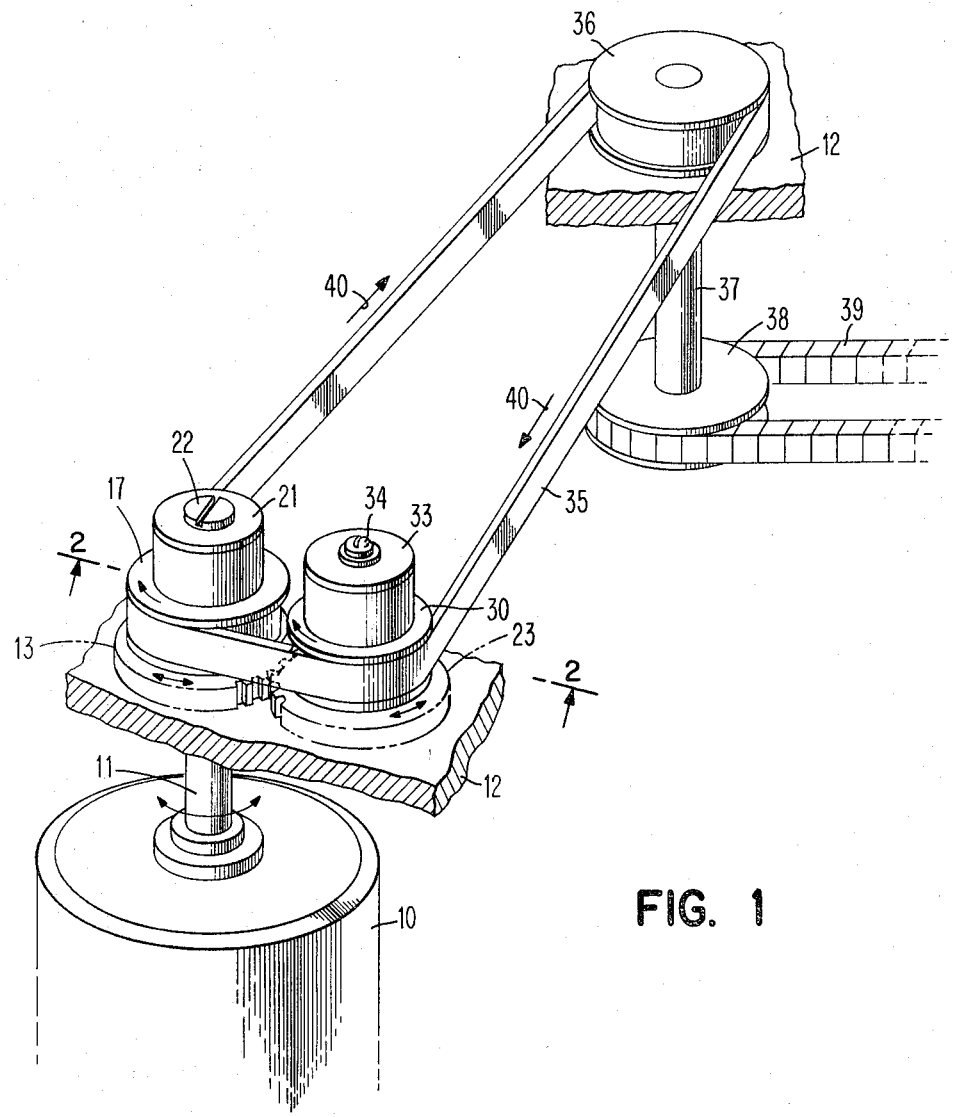
FIG. 1 is an isometric view of a first embodiment of the drive system of the invention.
Figure 2:
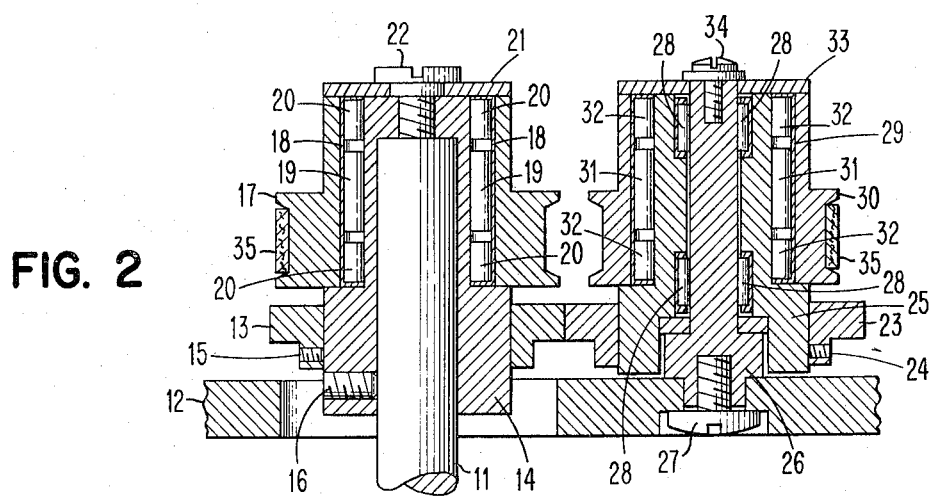
FIG. 2 is a section of the drive mechanism taken along line 2—2 of FIG. 1.

In the embodiment of FIGS. 1 and 2 a single-speed reversible motor 10 of any known type having an output shaft 11 is mounted on a support plate 12 by suitable means not shown. In a first unidirectional drive assembly, a drive gear 13 is concentrically mounted on and secured by means of a set screw 15 to a hub 14 which is fixed to the output shaft 11 by a set screw 16 for rotation by motor 10 in either direction. The first unidirectional drive assembly further comprises a free-wheeling clutch and pulley assembly concentrically mounted on hub 14. The free-wheeling clutch preferably comprises a clutch casing 18 force-fitted into the hub of a pulley 17 and clutch rollers 19 and bearings 20 in contact with the periphery of the hub 14. The clutch and pulley assembly is retained on the end of the hub 14 by a retaining disk 21 and a screw 22. The clutch casing 18 and clutch rollers 19 are designed to drivingly connect the pulley 17 in one direction of rotation of shaft 11 and hub 14, and to permit free-wheeling when the output shaft 11 is rotated in the reverse direction of rotation.

A second unidirectional drive assembly in accordance with this invention comprises drive gear 23 also mounted and secured by means of a set screw 24 to a hub adaptor 25, which is rotatably supported on a fixed idler shaft 26 secured to support plate 12 by screw 27. In the preferred form the idler shaft 26 is non-rotatable while drive gear 23 rotates with hub adaptor 25 on idler shaft 26. For this purpose hub adaptor 25 is provided with roller bearings 28 which rotatably support the hub adaptor 25 and gear 23 on the non-rotatable idler shaft 26.

The second unidirectional drive assembly further comprises a clutch and pulley assembly concentrically mounted on the idler shaft 26. The clutch and pulley assembly of the second unidirectional drive assembly, like the clutch and pulley assembly of the first unidirectional drive assembly, consists of a free-wheeling clutch and a pulley concentrically attached thereto. The free-wheeling clutch, like the previously-described clutch, comprises a casing 29 force fitted within the hub of the pulley 30 with the clutch rollers 31 and bearings 32 on the periphery of the hub adapter 25. The clutch casing 29 and rollers 31 are designed in a well-known manner to drivingly connect pulley 30 to the hub adapter 25 in one direction of rotation by drive gear 23 and to permit pulley 30 to free-wheel in the opposite direction of rotation of the hub adaptor 25 and gear 23. The pulley and clutch assembly and the hub adaptor 25 are retained in concentric arrangement on the idler shaft 26 by a retaining disk 33 and screw 34. In the second unidirectional drive assembly the free-wheeling clutch is operational to drivingly couple pulley 30 in the same rotational direction as pulley 17 is coupled to drive gear 13. In addition, hub adaptor 25 is designed to have a diameter substantially identical with the diameter of hub 14 so that the clutch and pulley assembly and gear 23 on idler shaft 26 can be interchanged with the clutch and pulley assembly and gear 23 on hub 19. In the embodiment of FIGS. 1 and 2, a single drive belt 35 is wrapped around the periphery of the drive pulleys 17 and 30 and a driven pulley 36 connected to driven shaft 37 rotatably supported on plate 12 or some other support plate at a selected distance from the drive motor 10. In the particular application for this invention, shaft 37 is part of a drive mechanism including a pulley 38 which has a drive belt with type elements 39 of a type used in an on-the-fly line printer.

In such printers it is often desirable to drive the type belt in either of two different speeds which are a predetermined ratio to each other. In accordance with this invention, as shown in FIGS. 1 and 2, the dual speeds are predetermined by using drive pulleys 17 and 30 and gears 13 and 23 of different diameters. Thus, great flexibility can be achieved with this structure. With pulleys and gears of different sizes eight different output speeds can be achieved merely by interchanging the pulleys and clutch assemblies and gears from drive hub 19 and idler hub 35. This is readily done by removing belt 35, then turning out screws 22 and 34 to remove retaining disks 21 and 33. The clutch and drive pulley assemblies are readily slipped from hub 14 of motor shaft 11 and hub adaptor 25. This will make the gears 17 and 23 accessible so they can also be removed and interchanged, and then refastened in place. Belt 35 is then rewound on the pulleys and the mechanism is again quickly ready for operation.

The following is an example of the total speed change capabilities of this invention:
1. Assume that motor 10 has bidirectional RPM of 3,600.
2. Gear 13 has a diameter of 12 units.
3. Gear 23 has a diameter of 10 units.
4. Pulley 17 has a diameter of 8 units.
5. PUlley 30 has a diameter of 6 units.
6. Pulley 36 has a diameter of 16 units.

A. In the depicted configuration, the two resultant speeds would be:
1. Motor 10 operating clockwise = 1800 RPM
2. Motor 10 operating counterclockwise = 1620 RPM B. By keeping the gears 13 and 23 on their present hubs and interchanging the pulleys 17 and 30, the two resultant speeds would be;
1. Motor 10 operating clockwise = 1350 RPM
2. Motor 10 operating counterclockwise = 2160 RPM C. By putting the pulleys 17 and 30 in their original positions and interchanging the gears 13 and 23 two resultant speeds would be:
1. Motor 10 operating clockwise = 1800 RPM
2. Motor 10 operating counterclockwise = 1123.2 RPM D. By interchanging both pulleys and gears, the two resultant speeds would be:
1. Motor 10 operating clockwise = 1350 RPM
2. Motor 10 operating counterclockwise = 1481.2 RPM The two-speed unidirectional drive mechanism of FIGS. 1 and 2 operate substantially as follows. For the drive belt 35 to move in a clockwise direction, as indicated by the arrows 40, the clutch for pulley 17 is designed to drivingly engage the pulley to the adaptor 14 when motor shaft 10 is rotating in a clockwise direction, as seen in FIG. 1. With the motor 10 rotating in a clockwise direction, gear 13 will drive gear 23 in a counterclockwise direction. The clutch for pulley 30 is designed and arranged to free-wheel when hub adaptor 25 is rotated with gear 23 in the counterclockwise direction. With pulley 17 rotating clockwise drive belt 35 will likewise move in a clockwise direction. Since pulley 30 is freed by its clutch, pulley 30 is driven by belts 35 to rotate in a free-wheeling manner in a clockwise direction. Thus, the output pulley 36 will rotate the output shaft 37 in the same clockwise direction. The speed at which the drive belt 35 will move is a function of the diameter and rotational speed of pulley 17.

To change speed of belt 35 without changing direction, motor 10 is driven in a reverse direction at its single speed causing output shaft 11 to be rotated in a counterclockwise direction as seen in FIG. 1. This causes pulley 17 to be drivingly disengaged from adaptor 14 and shaft 11. Gear 13, rotating in a counterclockwise direction, drives gear 23 in a clockwise direction. Pulley 30 is now driven through hub adaptor 25 and the engagement of its clutch to rotate in the clockwise direction. Belt 35 therefore is driven by pulley 30 in the same clockwise direction as previously, but now it is being driven at a speed determined by the diameter of pulley 30 relative to pulley 17 and gears 13 and 23 and previously shown.

Figure 3:
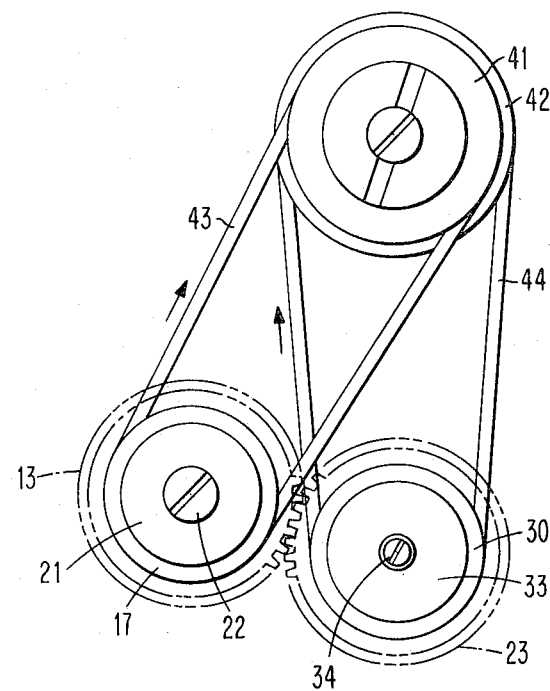
FIG. 3 is a plan view of a second embodiment of a drive system of this invention.
Figure 4:
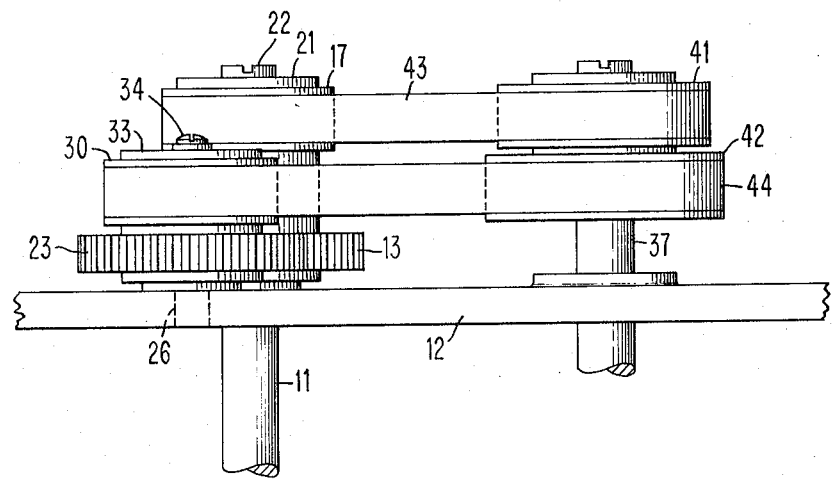
FIG. 4 is a side elevation of the drive system of FIG. 3.

In the embodiment of FIGS. 3 and 4 the same drive assemblies as shown in FIGS. 1 and 2 are attached in substantially the same way on drive shaft 11 and idler shaft 26. In this embodiment the two shafts are of different height so that drive pulleys 17 and 30 are at different height levels. The drive gears 13 and 23 are mounted in engagement to be rotated in opposite directions when shaft 11 is driven by its motor 10. In the embodiment of FIGS. 3 and 4 the driven shaft 37 has pulleys 41 and 42 fixedly mounted in any suitable manner to shaft 37. Drive belt 43 drivingly connects drive pulley 17 and pulley 41, while drive belt 44 connects drive pulley 30 and pulley 42. In this embodiment shaft 37 is rotated in the same predetermined direction by either belt 43 or 44 depending on which direction motor shaft 11 is rotated and the alternate engagement of freewheeling clutches coupled to drive pulleys 17 and 30.

Dual speed is selected in the embodiment of FIGS. 3 and 4 by making pulleys 41 and 42 of different diameters. Alternatively, as in the first embodiment, the dual speeds can be set by different size drive pulleys 17 and 30 and different size drive gears 13 and 23 or by any combination of all three. With this structure also, parts can be quickly disassembled and interchanged without changing the relative locations of the shafts 11, 26 and 37, thereby giving great flexibility to the drive mechanism in applications to various designs. In one specific arrangement pulleys 41 and 42 are removed and interchanged to effect changing of the speed ratios. In this embodiment a total of 16 different output speeds can be achieved by merely interchanging the pulleys and gears.

While the invention has been particularly shown and described with reference to preferred embodiments thereof, it will be understood by those skilled in the art that the foregoing and other changes in form and details may be made therein without departing from the spirit and scope of the invention.

I claim:

1. A two-speed unidirectional drive system comprising
    a single-speed reversible motor with an output shaft, a first drive gear and a first drive pulley concentrically supported on said output shaft,
    a first free-wheeling clutch mechanism coupling said first drive pulley in a first rotational direction to said output shaft,
    an idler shaft parallel with said output shaft,
    a second drive gear and a second drive pulley concentrically supported on said idler shaft in coplanar relation with said first drive gear and said first drive pulley respectively,
    said second drive gear having a driving connection with said first drive gear,
    a second free-wheeling clutch mechanism coupling said second drive pulley in said first rotational direction to said idler shaft,
    said first and second drive gears or said first and second drive pulleys or both being a different size whereby a dual speed unidirectional rotation of various ratios is obtained
    a driven shaft parallel with said output and said idler shaft,
    a driven pulley fixedly coupled to said driven shaft, and a drive belt connecting said first and second drive pulley and said driven pulley.

2. A two-speed unidirectional drive system comprising
    a single-speed reversible motor with an output shaft;
    a first unidirectional drive assembly mounted on said output shaft, comprising
        a first drive gear attached to said shaft,
        a first drive pulley concentrically supported on said shaft and
        a first free-wheeling clutch mechanism coupling said first drive pulley in a first rotational direction to said output shaft;
    an idler shaft parallel with said output shaft;
    a second unidirectional drive assembly mounted on said idler shaft comprising
        a second drive gear and a second drive pulley concentrically supported on said idler shaft in coplanar relation with said first drive gear and said first drive pulley respectively,
        said second drive gear having a driving connection with said first drive gear;
        a second free-wheeling clutch mechanism coupling said second drive pulley in said first rotational direction to said idler shaft,
        said first and second drive gears or said first and second drive pulleys or both being a different size whereby a dual speed unidirectional rotation of various ratios is obtained;
    a driven shaft parallel with said output and said idler shaft;
    pulley means coupled to said driven shaft;
    drive belt means connecting said first and second drive pulleys of said first and drive assemblies and said pulley means of said driven shaft.

3. A two-speed unidirectional drive system in accordance with claim 2 in which said pulley means is a single pulley attached to said driven shaft and
    said belt means comprises a single pulley belt having a common surface drivingly engaging said first and second drive pulley and said pulley on said driven shaft.

4. A two-speed unidirectional drive system in accordance with claim 2 in which
    said first and second drive pulleys are of different diameters.

5. A two-speed unidirectional drive system in accordance with claim 4 in which
    said first and second drive gears are of different pitch.

6. A two-speed unidirectional drive system in accordance with claim 2 in which
    said pulley means comprises a pair of driven pulleys,
    said driven pulleys being of different sizes,
    and said drive belt means comprises a first drive belt connecting said first drive pulley and one of said driven pulleys and a second drive belt connecting said second drive pulley and the other of said driven pulleys.

* * * * *